US006882621B1

United States Patent
Köpp et al.

(10) Patent No.: US 6,882,621 B1
(45) Date of Patent: Apr. 19, 2005

(54) METHOD FOR EQUIVALENTLY CONNECTING SUBASSEMBLIES IN 1:N REDUNDANCY

(75) Inventors: Jörg Köpp, Münich (DE); Siegfried Huber, Reichertshofen (DE); Gert Hoffmann, Gröbenzell (DE); Annette Roder, Münich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/673,533

(22) PCT Filed: Mar. 3, 1999

(86) PCT No.: PCT/DE99/00561

§ 371 (c)(1),
(2), (4) Date: Oct. 17, 2000

(87) PCT Pub. No.: WO99/55100

PCT Pub. Date: Oct. 28, 1999

(30) Foreign Application Priority Data

Apr. 17, 1998 (DE) ......................................... 198 17 158

(51) Int. Cl.⁷ ................................................. H04J 1/16
(52) U.S. Cl. ....................................... 370/217; 370/221
(58) Field of Search ................................. 370/216–228

(56) References Cited

U.S. PATENT DOCUMENTS

| 5,014,261 A | * | 5/1991 | Shinbashi et al. ........... 370/220 |
| 5,787,070 A | * | 7/1998 | Gupta et al. ................ 370/217 |
| 5,790,518 A | * | 8/1998 | Nguyen et al. ............. 370/217 |
| 6,021,111 A | * | 2/2000 | Soga ........................... 370/221 |
| 6,108,300 A | * | 8/2000 | Coile et al. ................. 370/217 |
| 6,308,286 B1 | * | 10/2001 | Richmond et al. ............ 714/13 |
| 6,366,557 B1 | * | 4/2002 | Hunter ....................... 370/217 |

FOREIGN PATENT DOCUMENTS

| DE | 40 02 022 | 7/1991 |
| DE | 196 46 016 | 5/1998 |
| EP | 0 496 214 | 7/1992 |
| FR | 2 403 704 | 4/1979 |
| GB | 2 014 018 | 8/1979 |
| LU | 86734 | 6/1987 |

OTHER PUBLICATIONS

Rathgeb, E. P. et al., "The MainStreetXpress Core Services Node—A Versatile ATM Switch Architecture for the Full Service Network", IEEE Communications vol. 15, No. 5, Jun. (1997), pp. 795–806, XP000657033, 803–805, Absatz III.

* cited by examiner

Primary Examiner—Chau Nguyen
Assistant Examiner—Christine Ng
(74) Attorney, Agent, or Firm—Fish & Richardson P.C.

(57) ABSTRACT

In the Prior Art, a higher-ranking mechanism controls the standby circuiting of assemblies in 1:N redundancy, resulting in a system dynamics loss. The invention solves this problem in that the devices responsible for the standby circuiting events in the higher-ranking mechanism are relocated into a standby circuit assembly of the 1:N redundancy provided for standby circuiting purposes. The standby circuit events are thus controlled and monitored by the standby circuit assembly itself, relieving the higher-ranking mechanism of these tasks.

7 Claims, 1 Drawing Sheet

METHOD FOR EQUIVALENTLY CONNECTING SUBASSEMBLIES IN 1:N REDUNDANCY

BACKGROUND OF THE INVENTION

1. Field of the Invention

The invention is directed to a method for implementing standby circuiting of assemblies in 1:N redundancy.

2. Description of the Related Art

Redundancies are often used to improve reliability in communication systems. Depending on the required reliability of a communication means, different redundancy structures can be provided for the associated peripheral line assemblies. Examples of this are the "1+1" or the "1:N" line assembly redundancy described in "IEEE Journal on Selected Areas in Communications", Vol. 15, No. 5, June 1997, pages 795 through 806. For a "1+1' redundancy structure, two line assemblies are operated parallel in order to redundantly transmit message signal streams over them, only one of these redundant message signal streams is considered for the further-processing.

For a "1:N" line assembly redundancy, a single standby line assembly or standby circuit assembly is provided in addition to a plurality N of line assemblies. When a fault occurs on one of the N line assemblies, the standby line assembly is then used in its place.

In the Prior Art, the standby circuiting of assemblies in 1:N redundancy requires a means that maintains all information about current conditions and events within a redundancy group. This means is thus in the position to decide about required standby circuiting measures. This high-ranking means is usually the maintenance-oriented higher-ranking means of the periphery assemblies. This means must also be in the position to implement necessary alternate routings in the shortest possible time (<1 s) or, respectively, to control and monitor malfunction-free switchbacks so that the down time or, respectively, the data loss of the affected lines is minimized. The failure of a peripheral line assembly is recognized by the respectively neighboring peripheral assembly in this Prior Art.

FIG. 2 illustrates the configuration employed in the Prior Art which uses a 1:N line assembly redundancy. By way of example, only the peripheral line assemblies $BG_1$, $BG_2$ are shown, these being respectively allocated to one another in pairs. Both assemblies comprise connections $V_1$ to one another via which a mutual monitoring is implemented. Further, internal and external interfaces are allocated to the peripheral line assemblies $BG_1$ . . . $BG_n$. The internal interfaces serve as interfaces to the assemblies AMX of the ATM switching network, whereas the external interfaces represent interfaces to the connected trunks for the other switching network devices. The assemblies $BG_1$ . . . $BG_n$ also comprise connections $V_2$ to the assemblies AMX of the ATM switching network, only the connection $V_2$ of the assemblies $BG_1$ to the assemblies AMX is shown here. All assemblies $BG_1$ . . . $BG_n$ as well as the allocated internal and external interfaces are monitored and controlled by a higher-ranking mechanism MPSA.

Let it then be assumed below that one of the peripheral line assemblies fails, for example $BG_1$. A corresponding message $M_A$ is consequently delivered to the higher-ranking maintenance means MPSA. This then starts a diagnosis in order to localize the fault and, potentially, verify it.

In a first step, an attempt is made to directly address the down device $BG_1$. In the case assumed here that the affected peripheral assembly $BG_1$ has a total failure, this failure is not recognized by the higher-ranking mechanism MPSA until after the expiration of a number of monitoring events. Only then can it be reliably assumed that assembly $BG_1$ can no longer be addressed and, thus, is no longer available. A diagnosis of the appertaining peripheral assembly is subsequently initiated for verification of the fault. The appertaining peripheral assembly is not configured until the end of this diagnosis, the actual alternate routing being implemented only then. To this end, the internal and external interfaces must also be switched and the standby circuit assembly must correspondingly activated.

This the higher-ranking mechanism MPSA sends a message to the standby circuit assembly, controls the switching of the external and internal interfaces to the standby circuit assembly $BG_E$ and sends information to the affected applications.

However, the higher-ranking mechanism MPSA is mainly occupied with standby circuiting measures, which results in a loss of system dynamics. Further, a number of other assemblies that actually do not participate in the switchover process itself are integrated in the switchover process losing more valuable time. Ultimately, such a configuration runs counter to the principle of decentrally arranged maintenance in which the alternate routing is a job of the peripheral devices themselves.

SUMMARY OF THE INVENTION

The invention is based on the object of providing a way of implementing standby circuitings for peripheral assemblies faster and more efficiently without restricting the system dynamics.

This object is achieved by a method for standby circuiting of assemblies in 1:N redundancy, comprising the steps of providing peripheral line assemblies that are respectively allocated to one another in pairs and that comprise connections to one another; mutually monitoring each of the peripheral lines assemblies within each pair of the pairs via the connections; providing a standby circuit assembly that takes the place of a down peripheral line assembly in case of a failure of one of the peripheral line assemblies; providing internal and external interfaces that have an interactive connection to the peripheral line assemblies; monitoring and controlling all devices with a higher-ranking mechanism; determining an outage of one of the peripheral line assemblies by a remaining peripheral line assembly that had been paired with the out peripheral line assembly; sending, after the step of determining the outage, a message from the peripheral line assembly determining the outage to the standby circuit assembly; switching, by the standby circuit assembly, the internal and external interfaces by driving switches; and activating, after the step of switching, the standby circuit assembly by itself.

What is advantageous about the invention is, in particular, that the standby circuiting or, respectively, switchback of a malfunctioning assembly is undertaken by the peripheral assemblies themselves under the control of the standby circuit assembly, independently of a higher-ranking mechanism. The basic principles of 1+1 assembly applied in this approach. The basic executive sequences of the 1+1 assembly redundancy are thereby largely transferred to the 1:N redundancy. This has the advantage that synergies can be employed and performance features that are already available for the 1+1 redundancy can also be made usable for the 1:N redundancy. An example of this is the soft switching between individual peripheral assemblies and the standby circuit assembly in both directions without call interruption and saving of charge data. The inventive step is comprised in that the principles of decentralized maintenance are consistently converted for the 1:N redundancy with the assistance of the standby circuit assembly, the switchover times are considerably improved and the quality of the redundancy is improved.

Advantageous developments include additionally sending, by the peripheral line assembly determining the outage, an outage message to the higher-ranking mechanism.

The inventive method may also include the sequential steps of recognizing the outage of one of the peripheral line assemblies by an interface belonging to the switching network; and sending, by the interface belonging to the switching network, a corresponding message to the higher-ranking mechanism.

BRIEF DESCRIPTION OF THE DRAWINGS

The invention is explained in greater detail below in the drawings and associated text on the basis of an exemplary embodiment.

DESCRIPTION OF THE PREFERRED EMBODIMENTS

Figure 1:
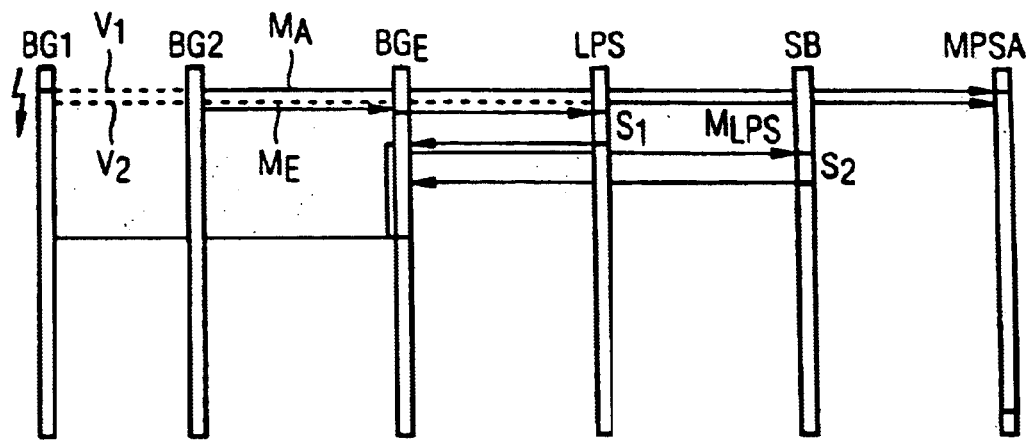
FIG. 1 is a pictorial schematic showing a configuration on which the inventive method is run.
Figure 2:
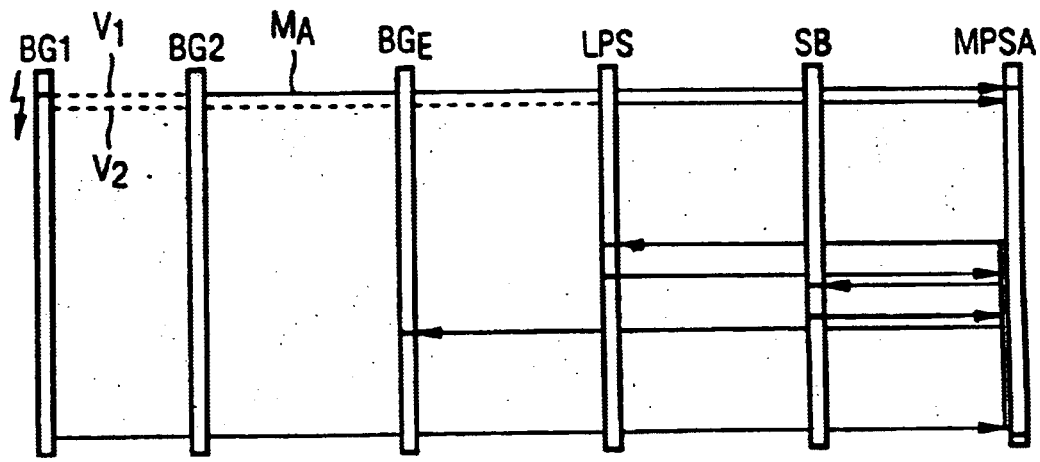
FIG. 2 is a pictorial schematic showing the conditions in the Prior Art.

FIG. 1 shows a configuration on which the inventive method is run in which peripheral line assemblies $BG_1 \ldots BG_n$ are provided, (only two of these peripheral line assemblies $BG_1$, $BG_2$ are shown). The two assemblies are respectively allocated to one another in pairs and comprise connections $V_1$ to one another via which a mutual monitoring is carried out. Further, internal and external interfaces are allocated to the peripheral line assemblies $BG_1 \ldots BG_n$. The internal interfaces serve as interfaces the assemblies AMX of the ATM switching network, whereas the external interfaces represent interfaces to the connected trunks hereto for the other switching network devices. The assemblies $BG_1 \ldots BG_2$ also comprise connections $V_2$ to the assemblies AMX of the ATM switching network, (only the connection $V_2$ of the assemblies $BG_1$ to the assemblies AMX is shown here). All assemblies $BG_1 \ldots BG_n$ as well as the allocated internal and external interfaces are monitored and controlled by a higher-ranking mechanism MPSA. Further a standby circuit assembly $BG_E$ is provided in this 1:N redundancy group which is intended to take the place of the down assembly for an assembly outage. Ultimately, switches LPS and SB are provided that reroute the ATM cell streams between the internal or, external interfaces and the peripheral line assemblies.

A pre-condition of the inventive method is that connections between the standby circuit assembly $BG_E$ and all peripheral line assemblies are provided, so that a constant communication relationship [sic] prevails. Likewise, the standby circuit assembly $BG_E$ must be in the position to switch the internal interfaces from a peripheral assembly to the standby circuit assembly. Further, the standby circuit assembly must be in the position of switching the external interfaces of a peripheral line assembly to the standby circuit assembly $BG_E$. Ultimately, every peripheral line assembly must recognize the failure of its neighboring peripheral line assembly in order to be able to report a corresponding message to the standby circuit assembly $BG_E$. If assembly $BG_1$ fails, the failure is identified via the trunk $V_1$ by the paired, allocated assembly $BG_2$. Subsequently, the assembly $BG_2$ transmits a corresponding message $M_E$ to the standby circuit assembly $BG_E$. Further, the higher-ranking means MPSA is likewise informed of the failure via a message $M_A$, so that a current image of the system configuration continues to be stored in the latter.

The failure of the peripheral line assembly $BG_1$ is also recognized by the assembly AMX that, as part of the switching network, comprises a connection $V_2$ to the down peripheral line assembly $BG_1$. The higher-ranking means MPSA is informed of the failure via a message $M_{LPS}$.

In response to the message $M_E$, the standby circuit assembly $BG_E$ implements the alternate routing. First, the internal interfaces are switched. This ensues by driving a switch LPS that accomplishes a switching event $S_1$. Subsequently, the switchover of the external interfaces ensues by driving a switch SB that effects a switching event $S_2$. Only then is the standby circuit assembly $BG_E$ activated, this now having the function of the down assembly $BG_1$ and handling the ATM message cell stream routed over it before the failure.

The error handling on the higher-ranking mechanism MPSA runs completely independently of this process. The separation between the standby circuit that is controlled by the standby circuit assembly and the outage handling by the higher-ranking maintenance assembly becomes clear with reference to the present exemplary embodiment for the standby circuiting of a peripheral line assembly in 1:N redundancy.

The above-described method is one aspect of the present invention. Numerous modifications and adaptations thereof will be readily apparent to those skilled in the art without departing from the spirit and scope of the present invention.

What is claimed is:

1. A method comprising:
    monitoring a first line assembly using a second line assembly via a first connection connecting the first line assembly to the second line assembly;
    monitoring the second line assembly using the first line assembly through the first connection, the second line assembly connecting to a switching network via an internal interface, the second line assembly connecting to other switching networks via an external interface, the second line assembly handling a communication stream;
    monitoring the first line assembly, the second line assembly, the internal interface and the external interface with a device;
    detecting an outage of the second line assembly using the first line assembly;
    after detecting the outage, sending a message from the first line assembly to a standby line assembly;
    switching, using the standby line assembly, the internal interface and the external interface from the second line assembly to the standby line assembly; and
    activating the standby line assembly to handle the communication stream.

2. The method of claim 1, further comprising sending an outage message from the first line assembly to the device.

3. The method of claim 1, further comprising:
    detecting the outage of the second line assembly using a second connection connecting the second line assembly to the switching network; and sending a corresponding message to the device using the second connection.

4. A method comprising:

monitoring a first line assembly using a second line assembly through a first connection connecting the first line assembly to the second line assembly;

monitoring the second line assembly using the first line assembly through the first connection, the second line assembly connecting to a switching network via an internal interface, the second line assembly connecting to other switching networks via an external interface, the second line assembly handling a communication stream;

monitoring the first line assembly, the second line assembly, the internal interface and the external interface with a device;

detecting an outage of the second line assembly using the first line assembly;

after detecting the outage, sending a message from the first line assembly to a standby line assembly;

switching, using the standby line assembly, the internal interface and the external interface from the second line assembly to the standby line assembly;

activating the standby line assembly to handle the communication stream; and sending an outage message from the first line assembly to the device.

5. The method of claim 4, further comprising:

detecting the outage of the second line assembly using a second connection connecting the second line assembly to the switching network; and sending a corresponding message to the device using the second connection.

6. A method comprising:

monitoring a first line assembly using a second line assembly through a first connection connecting the first line assembly to the second line assembly;

monitoring the second line assembly using the first line assembly through the first connection, the second line assembly connecting to a switching network via an internal interface, the second line assembly connecting to other switching networks via an external interface, the second line assembly handling a communication stream;

monitoring the first line assembly, the second line assembly, the internal interface and the external interface with a device;

detecting an outage of the second line assembly using the first line assembly;

after detecting the outage, sending a message from the first line assembly to a standby line assembly;

switching, using the standby line assembly, the internal interface and the external interface from the second line assembly to the standby line assembly;

activating the standby line assembly to handle the communication stream;

detecting the outage of the second line assembly using a second connection connecting the second line assembly to the switching network; and sending a corresponding message to the device using the second connection.

7. The method of claim 6, further comprising sending an outage message from the first line assembly to the device.

* * * * *

UNITED STATES PATENT AND TRADEMARK OFFICE
CERTIFICATE OF CORRECTION

PATENT NO. : 6,882,621 B1  Page 1 of 1
APPLICATION NO. : 09/673533
DATED : April 19, 2005
INVENTOR(S) : Jorg Kopp et al.

It is certified that error appears in the above-identified patent and that said Letters Patent is hereby corrected as shown below:

On the Title Page Item 54, and in col. 1, lines 1-3,
Title:

Delete [METHOD FOR EQUIVALENTLY CONNECTING SUBASSEMBLIES IN 1:N REDUNDANCY] and Insert -- METHOD FOR STANDBY CIRCUITING OF ASSEMBLIES IN 1:N REDUNDANCY --

Signed and Sealed this

Fifteenth Day of April, 2008

JON W. DUDAS
*Director of the United States Patent and Trademark Office*